United States Patent
Mirantes et al.

(10) Patent No.: US 11,403,094 B2
(45) Date of Patent: Aug. 2, 2022

(54) SOFTWARE PIPELINE CONFIGURATION

(71) Applicant: Capital One Services, LLC, McLean, VA (US)

(72) Inventors: Luis Mirantes, McLean, VA (US); Ryan McEntee, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/159,613

(22) Filed: Jan. 27, 2021

(65) Prior Publication Data

US 2021/0232388 A1 Jul. 29, 2021

Related U.S. Application Data

(60) Provisional application No. 62/966,442, filed on Jan. 27, 2020.

(51) Int. Cl.
*G06F 9/44* (2018.01)
*G06F 8/71* (2018.01)
*G06F 8/60* (2018.01)
*G06F 11/36* (2006.01)
*G06F 8/41* (2018.01)

(52) U.S. Cl.
CPC ............ *G06F 8/71* (2013.01); *G06F 8/60* (2013.01); *G06F 8/41* (2013.01); *G06F 11/3668* (2013.01)

(58) Field of Classification Search
None
See application file for complete search history.

(56) References Cited

U.S. PATENT DOCUMENTS

| | | | |
|---|---|---|---|
| 9,910,654 B1* | 3/2018 | Brigham, II | G06F 8/61 |
| 2004/0230967 A1* | 11/2004 | Yuknewicz | G06F 8/71 |
| | | | 717/170 |
| 2009/0328028 A1* | 12/2009 | O'Rourke | G06F 8/65 |
| | | | 717/173 |
| 2013/0232480 A1* | 9/2013 | Winterfeldt | G06F 8/60 |
| | | | 717/177 |
| 2018/0136951 A1* | 5/2018 | Palavalli | G06F 8/60 |
| 2019/0138288 A1* | 5/2019 | Brealey | G06F 8/65 |

OTHER PUBLICATIONS

M. Zulfahmi Toh et al., "Adoption Issues in DevOps from the Perspective of Continuous Delivery Pipeline", Feb. 2019 (Year: 2019).*
Simon Hacks et al., "A Continuous Delivery Pipeline for EA Model Evolution", May 2019 (Year: 2019).*

* cited by examiner

*Primary Examiner* — Wei Y Zhen
*Assistant Examiner* — Lanny N Ung
(74) *Attorney, Agent, or Firm* — Perkins Coie LLP

(57) ABSTRACT

In certain embodiments, a software pipeline ("pipeline") is configured by the use of gates for progressing an application from one stage to another (e.g., from a development stage to a production stage). A configuration file having a set of attribute values that is descriptive of an application, and a gate mapping file having information associated with the gates to be invoked for different combinations of attribute values are obtained. The configuration file is processed using the gate mapping file to determine a set of gates to be invoked for progressing the application in the pipeline based on the attribute values of the application. The set of gates are invoked to cause a corresponding set of software routines to be executed for progressing the application.

20 Claims, 5 Drawing Sheets

SOFTWARE PIPELINE CONFIGURATION

CROSS-REFERENCE TO RELATED APPLICATION

This application claims the benefit of priority of U.S. provisional application No. 62/966,442, filed Jan. 27, 2020, the content of which is incorporated herein in its entirety by reference.

TECHNICAL FIELD

The disclosed embodiments relate to software pipelines, including, configuring the pipeline to perform various actions for progressing an application from one stage to another.

BACKGROUND

A software pipeline is a set of automated processes that allows users (e.g., software developers) to compile, build and deploy application code to production compute platforms reliably and efficiently. Pipeline tools enable automated progression of the application code from one stage to another (e.g., development stage to the production stage where the application is made available to consumers of the application). The application code is subjected to various actions or processes, such as software code quality tests (e.g., code error tests) or other tests, as the code progresses through the pipeline. The pipeline tools execute a set of software routines to perform these actions.

Current pipeline tools are inefficient in facilitating customization (e.g., at user level) of the performance of such actions for different user-defined application code. Performing such actions may require a significant amount of coding in the pipeline tools (e.g., conditional statements), which not only requires significant time and effort from the users but also makes the code complex to debug. Further, the complexity of the code may increase exponentially with the number of actions to be performed. The actions may be specific to the application being progressed, and therefore, the pipeline is typically customized for the application, which may necessitate that users rewrite the code to progress a different application. As an example, current pipeline tools are inefficient for handling scenarios in which different types of applications from any source (e.g., different model development environments) may have to be progressed to any destination (e.g., different production execution environments), and potentially executing different steps along the pipeline depending on specific actions that the applications being progressed may be subject to. This may require the pipeline steps to be coded for each scenario. Further, the pipeline tools perform some of these actions sequentially, causing a performance of one action to be dependent another. These and other drawbacks exist.

SUMMARY

Aspects of the disclosed embodiments relate to methods, apparatuses, and/or systems for configuring a software pipeline ("pipeline") by the use of gates for progressing an application in the pipeline (e.g., from a development subsystem to a destination subsystem such as a production environment).

In some embodiments, a system obtains a configuration file having a set of attribute values that is descriptive of an application, obtains a gate mapping file having information associated with the gates to be invoked for different combinations of attribute values, processes the configuration file using the gate mapping file to determine a set of gates to be invoked for progressing the application in the pipeline, and invokes the set of gates causing the corresponding set of software routines to be executed for progressing the application (e.g., to a destination subsystem). As an example, the configuration file may include attribute values for multiple attributes of the application such as process type, materiality, destination, operation mode, release size, programming language, or region of the application. Each of the attributes may have one or more attribute values. For example, the process type attribute, which indicates a type of the application to be progressed in the pipeline, may have a value of "model," "end user calculator (EUC)," "report," "high-priority data," or other values. The materiality attribute may have a value "material" or "immaterial," which is indicative of a degree of impact of the application on an organization or other applications. The destination attribute may have a value "exploratory" or "production," which is indicative of an environment or destination subsystem where the application is to be deployed (e.g., a cloud platform such as Elastic MapReduce (EMR)).

In some embodiments, a gate is a software component that represents an action to be performed for progressing the application in the pipeline and corresponds to a software routine that performs the action (e.g., a software routine for compiling application code). Different gates may correspond to different actions. The gate mapping file includes mappings of gates and attribute values. As an example, each gate mapping indicates a set of gates to be invoked for a set of attribute values. In other words, the gate mapping file indicates that a first set of actions are to be performed if an application has a first set of attribute values and a second set of actions are to be performed if an application has a second set of attribute values. When a first application is to be progressed in the pipeline, a first configuration file having a first set of attribute values for the first application are provided to a pipeline subsystem. The pipeline subsystem processes the first configuration file with gate mapping file to identify a first mapping that has attribute values matching the first set of attribute values. The pipeline subsystem obtains a first set of gates from the identified mapping, which may be invoked by a state machine subsystem to cause the corresponding set of software routines to execute on one or more portions of the first application.

By identifying the set of software routines to be executed on the application using the gate mapping file and the configuration file, a need for the users to develop complex code for executing those software routines is eliminated. The computing resources otherwise consumed in developing and/or executing such complex code is minimized. Further, the pipeline subsystem may be reused to progress another application (e.g., a second application) which further saves the computing resources otherwise needed to redevelop the complex code for the second application. The users may provide a second configuration file having attribute values that are descriptive of the second application, which may be used by the pipeline subsystem to identify a second set of gates to be invoked for progressing the second application. Furthermore, in some embodiments, the state machine subsystem may be configured to cause one or more such software routines to execute asynchronously (e.g., instead of sequentially or synchronously), thereby removing the dependence of execution of one software routine on the other.

Various other aspects, features, and advantages of the invention will be apparent through the detailed description and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
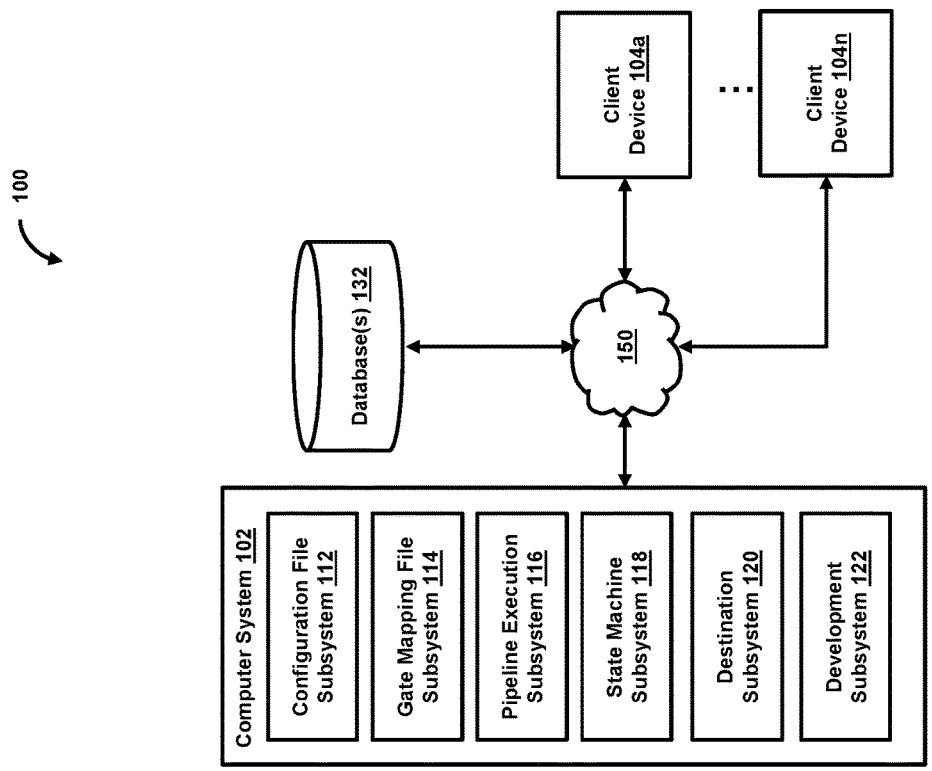
FIG. 1 shows a system for facilitating configuration of a software pipeline, in accordance with one or more embodiments.

FIG. 1 shows a system 100 for facilitating configuration of a software pipeline, in accordance with one or more embodiments. As shown in FIG. 1, system 100 may include computer system 102, client device 104 (client devices 104a-104n), or other components. Computer system 102 may include configuration file subsystem 112, gate mapping file subsystem 114, pipeline execution subsystem 116, state machine subsystem 118, destination subsystem 120, development subsystem 122, or other components. By way of example, computer system 102 may include a distributed system, a cloud-based system, a container environment on one or more servers, or other systems. Each client device 104 may include any type of mobile terminal, fixed terminal, or other device. By way of example, client device 104 may include any computing device, such as a personal computer (PC), a laptop computer, a tablet computer, a hand-held computer, other computer equipment. Users may, for instance, utilize one or more client devices 104 to interact with one another, one or more servers, or other components of system 100.

A component of system 100 may communicate with one or more components of system 100 via a communication network 150 (e.g., Internet, a mobile phone network, a mobile voice or data network, a cable network, a public switched telephone network, or other types of communications networks or combinations of communications networks). The communication network may be a wireless or wired network.

It should be noted that, while one or more operations are described herein as being performed by particular components of system 100, those operations may, in some embodiments, be performed by other components of system 100. As an example, while one or more operations are described herein as being performed by components of computer system 102, those operations may, in some embodiments, be performed by components of client device 104.

In some embodiments, system 100 facilitates configuration of a software pipeline for progressing an application from one stage to another stage of the pipeline by the use of gates. A gate is a software component that is representative of an action and corresponds to one or more software routines for performing that action. The system 100 may invoke a gate to cause the corresponding software routine to be executed for performing the action. In some embodiments, different types of actions are to be performed on the application code for progressing the application through the pipeline (e.g., to deploy the application in destination subsystem 120, such as a production environment). The actions to be performed on the application code may include software code quality actions, compliance actions, or other actions. As an example, software code quality actions may include linting, building, testing, validating, deploying, or other actions on the application code. System 100 may deploy the application code in destination subsystem 120 if all the actions are performed successfully.

The actions to be performed on the application code may depend on attributes and attribute values of the application to be progressed. For example, a first set of actions may be performed on the application code if the attributes have a first set of attribute values and a second set of actions may be performed if the attributes have a second set of attribute values. The users may define the actions to be performed using a gate mapping file. The gate mapping file includes a number of mappings of gates and attribute values. Each mapping in the gate mapping file indicates a set of gates to be invoked for attributes having a set of attribute values.

System 100 may determine the gates to be invoked for the application based on a configuration file associated with the application. The configuration file may include properties of the application as attributes and attribute values. For example, the configuration file may include attributes "$A_1$" to "$A_n$". Each attribute may have one or more attribute values. For example, the attribute "$A_1$" may have a value "$V_1$" from a set of possible values "$V_1$" to "$V_m$," the attribute "$A_2$" may have a value "$V_3$" from a set of possible values "$V_1$" to "$V_p$," and so on. As an example, the configuration file may include attributes such as process type ("$A_1$"), destination ("$A_2$"), release type ("$A_3$"), geographical region ("$A_4$") where the application is to be deployed or where the consumers of the application are located, programming language of the application ("$A_5$"), materiality of the application ("$A_6$"), or other attributes. Each of the attributes may have one or more attribute values. For example, the process type attribute ("$A_1$"), which indicates a type of the application to be progressed in the pipeline, may have "model ($V_1$)," "EUC ($V_2$)," "report ($V_3$)," "high-priority data ($V_4$)," or other value as the attribute value, which indicates a type of application 208. The destination attribute ("$A_2$") may have "exploratory ($V_1$)," "production ($V_2$)," or another value as the attribute value, which is indicative of destination subsystem 120 where the application is to be deployed (e.g., a cloud platform such as EMR).

The programming language attribute ("$A_5$") may have "python ($V_1$)," "Java ($V_2$)," or another value as the attribute value, which is indicative of a programming language of the application. The materiality attribute ("$A_5$") may have "material ($V_1$)," "immaterial ($V_2$)", or other value as the attribute value, which is indicative of a degree of impact of the application 208 on an organization or one or more other applications. System 100 may process the configuration file and the gate mapping file to determine a mapping from the gate mapping file that matches the attribute values from the configuration file. After determining the mapping, system 100 may invoke the set of gates from the identified mapping, which causes a set of software routines to be executed to perform the corresponding actions.

Figure 2:
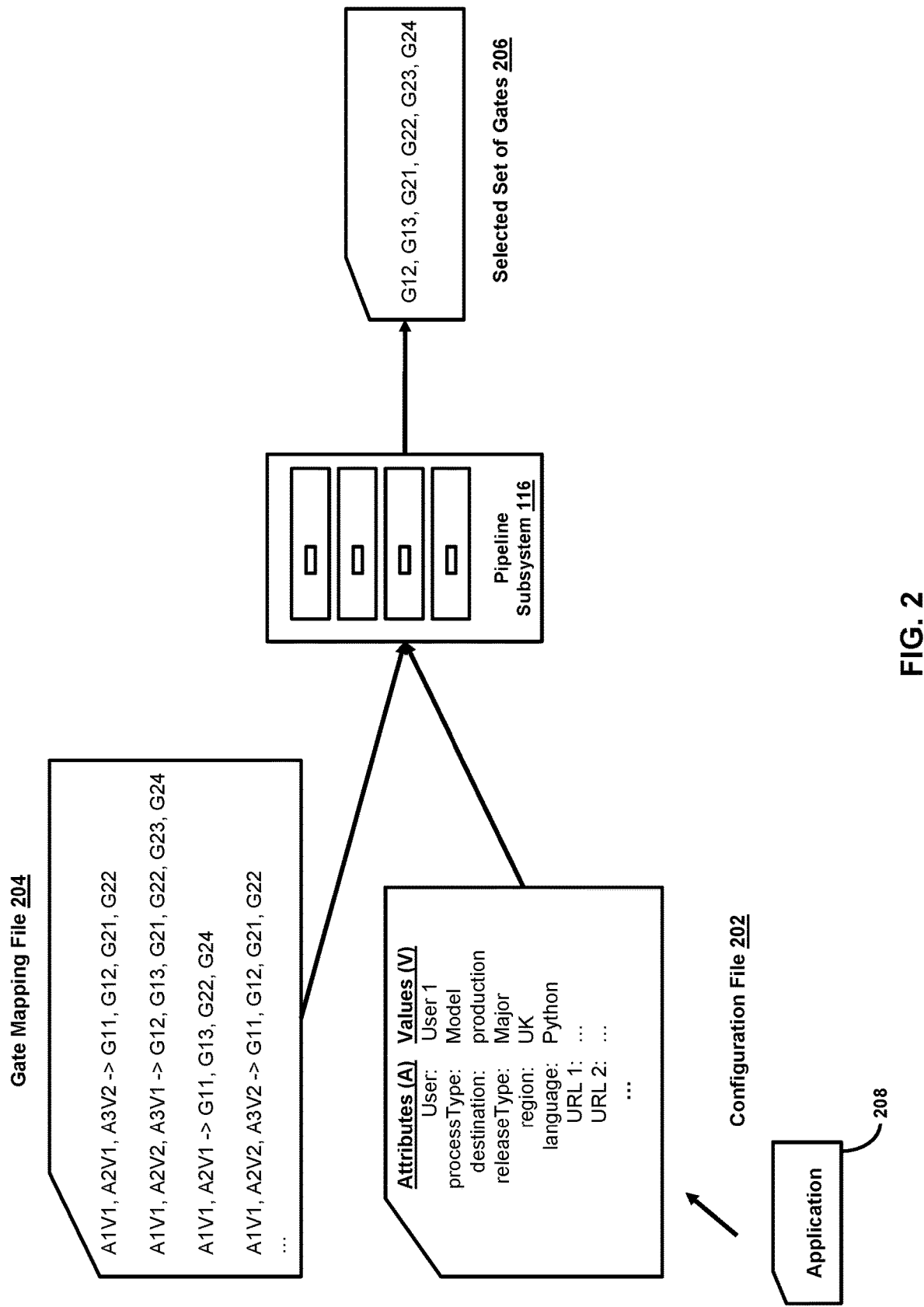
FIG. 2 shows a system configured to determine a set of gates to be invoked for progressing an application, in accordance with one or more embodiments.

As an example, FIG. 2 shows a system 100 configured to determine a set of gates to be invoked for progressing an application 208, in accordance with one or more embodiments. Configuration file 202 includes attributes and attribute values that are descriptive of application 208. As an example, configuration file 202 may include attributes such as process type ("$A_1$"), destination ("$A_2$"), release type ("$A_3$"), geographical region ("$A_4$") where application 208 is to be deployed or region of consumers of application 208, programming language of application 208 ("$A_5$"), and so on. The process type attribute ("$A_1$") has the attribute value "model ($V_1$)," which may indicate that application 208 employs a machine learning (ML) model. In some embodiments, the application code may include ML model. The destination attribute ("$A_2$") may have the attribute value "production ($V_2$)," which indicates that application 208 is to be deployed in a production destination subsystem 120 (e.g., a cloud platform such as EMR). The release type attribute ("$A_3$") may have the attribute value "major ($V_1$)," which is indicative of a type of release of application 208. The region attribute ("$A_4$") may have the attribute value "UK ($V_1$)" which may indicative that application 208 is to be deployed in or the consumers of application 208 are located in the United Kingdom. The programming language attribute ("$A_5$") may have the attribute value "python ($V_1$)," which is indicative of a programming language of the application. A uniform resource locator (URL) attribute may specify a location of a software component (e.g., a software routine), using an URL.

By having the ability to map values to gates, at least some pipeline actions can be customized to users. For example, two different users (e.g. code developer, risk approver, or other users) can have two different gate mapping files, which allows the pipeline actions to be tailored to user level, if necessary. In some embodiments, a gate mapping file may be selected based on one or more attribute values in configuration file. For example, if a user attribute has a first attribute value (e.g., "user 1") a first gate mapping file may be selected, if the user attribute has a second attribute value (e.g., "user 2"), a second gate mapping file may be selected. Accordingly, the pipeline actions to be executed may depend on one or more attribute values in configuration file 202. It should be noted that the above attributes or attribute values are examples, and the attributes or attribute values of application 208 are not limited to the above listed examples. For example, the configuration file 202 may have more, less, or different attributes or attribute values than illustrated in configuration file 202. Configuration file 202 may be in any format that is suitable for processing by system 100. For example, configuration file 202 may be in a text file format. In another example, configuration file 202 may be in YAML format, which is a human-readable data-serialization language.

Gate mapping file 204 includes mappings of gates and attribute values. Each of the gates—"$G_{11}$" to "$G_{1m}$," and "$G_{21}$" to "$G_{2n}$" is a software component that is representative of an action and corresponds to one or more software routines for performing that action. For example, gate "$G_{11}$" may represent a compliance action such as "peer check," and corresponds to a software routine for requesting another user for peer review of the application code and obtaining an approval from the other user. In another example, gate "$G_{21}$" may represent a software code quality action such as "linting," and corresponds to software routine for linting application code 208. In some embodiments, linting is a process that analyzes source code to flag programming errors, bugs, stylistic errors, or suspicious constructs. In some embodiments, at least one gate (e.g., $G_{11}$") may need user input to complete execution of the corresponding software routine. In some embodiments, building is a process of generating binaries of the application code to create deliverables that will be passed to the subsequent stages, such as testing. In some embodiments, testing is a process in which application 208 is rigorously tested to ensure that it meets all desired system qualities (e.g., functionality, security, performance, or other qualities). In some embodiments, deployment is a process in which application 208 is installed in a testing environment, staging environment which is a subset of the production environment, or production environment. When a gate is invoked, a software routine is executed for performing the corresponding action.

Each mapping in gate mapping file 204 indicates a set of gates to be invoked for a set of attribute values. In other words, each mapping indicates a set of actions to be performed for progressing an application having a set of attribute values. As an example, a first mapping in gate mapping file 204 indicates that a first set of gates—"$G_{12}$," "$G_{21}$," "$G_{22}$"—are to be invoked if the attributes "$A_1$," "$A_2$," "$A_3$" have values "$V_1$," "$V_1$," and "$V_2$" (denoted as "$A_1 V_1$," "$A_2 V_1$," "$A_3 V_2$"), respectively. In some embodiments, the mappings are generated based on user input from one or more users. For example, one or more users (e.g., users from a compliance team in an organization) may define that a specific set of actions are to be performed if an application has a specific set of attribute values, by creating mapping of the specific set of gates to the specific set of attribute values, as illustrated in gate mapping file 204. The users may determine what actions are to be performed for what attribute values, and may generate the mapping accordingly. For example, if an application is deployed in the UK, then performance of a compliance action to determine whether the code is compliant with General Data Protection Regulation (GDPR) may be required. The user may create a mapping to that effect, such as "$A_4 V_1 \rightarrow G_{13}$", where "$A_4 V_1$" represents the region attribute having value "UK" and gate "$G_{13}$" represents a compliance action. If the user determines that multiple gates may have to be invoked for a particular attribute value, the user may define the mapping accordingly. For example, the mapping "$A_4 V_1 \rightarrow G_{13} G_{12} G_{21}$" indicates that gates "$G_{13}$," "$G_{12}$," "$G_{21}$" are to be invoked for the attribute value "$A_4 V_1$."

The gate mapping file 204 may include a number of mappings indicating the gates to be invoked for various combinations of attribute values. It should be noted that gate mapping file 204 may not be specific to a particular application, and may be used to determine the gates to be invoked for any application based on the configuration file associated with the corresponding application.

The pipeline execution subsystem 116 processes configuration file 202 and gate mapping file 204 to determine a mapping from gate mapping file 204 that matches the attribute values from the configuration file 202. As an example, the pipeline execution subsystem 116 determines that a second mapping ("$A_1 V_1$," "$A_2 V_2$," "$A_3 V_1$") matches the attribute values from configuration file 202. Accordingly, pipeline execution subsystem 116 determines that the gates "$G_{12}$," "$G_{13}$," "$G_{21}$," "$G_{22}$," "$G_{23}$," and "$G_{24}$" in the second mapping (selected set of gates 206) to be invoked. It should be noted that pipeline execution subsystem 116 may consider all attribute values or a subset of the attribute values from configuration file 202 in determining the set of gates to be invoked. In the above example, pipeline execution subsystem 116 has determined the selected set of gates based on three matching attribute values from configuration file 202.

Gate mapping file 204 may be in any format that is suitable for processing by system 100. For example, gate mapping file 204 may be of a text file format or other format. For example, the mapping may be generated with actual attribute values and action names—"model+production+major+UK+python→riskcheck+lint+build+test+deploy," which indicates that the actions "risk check," "lint," "build," "test," and "deploy" are to be performed if the application has attribute values "model," "production," "major," "UK," and "python."

After determining the selected set of gates 206, system 100 may invoke the selected gates 206, which causes a set of software routines to be executed for performing the corresponding actions.

Figure 3:
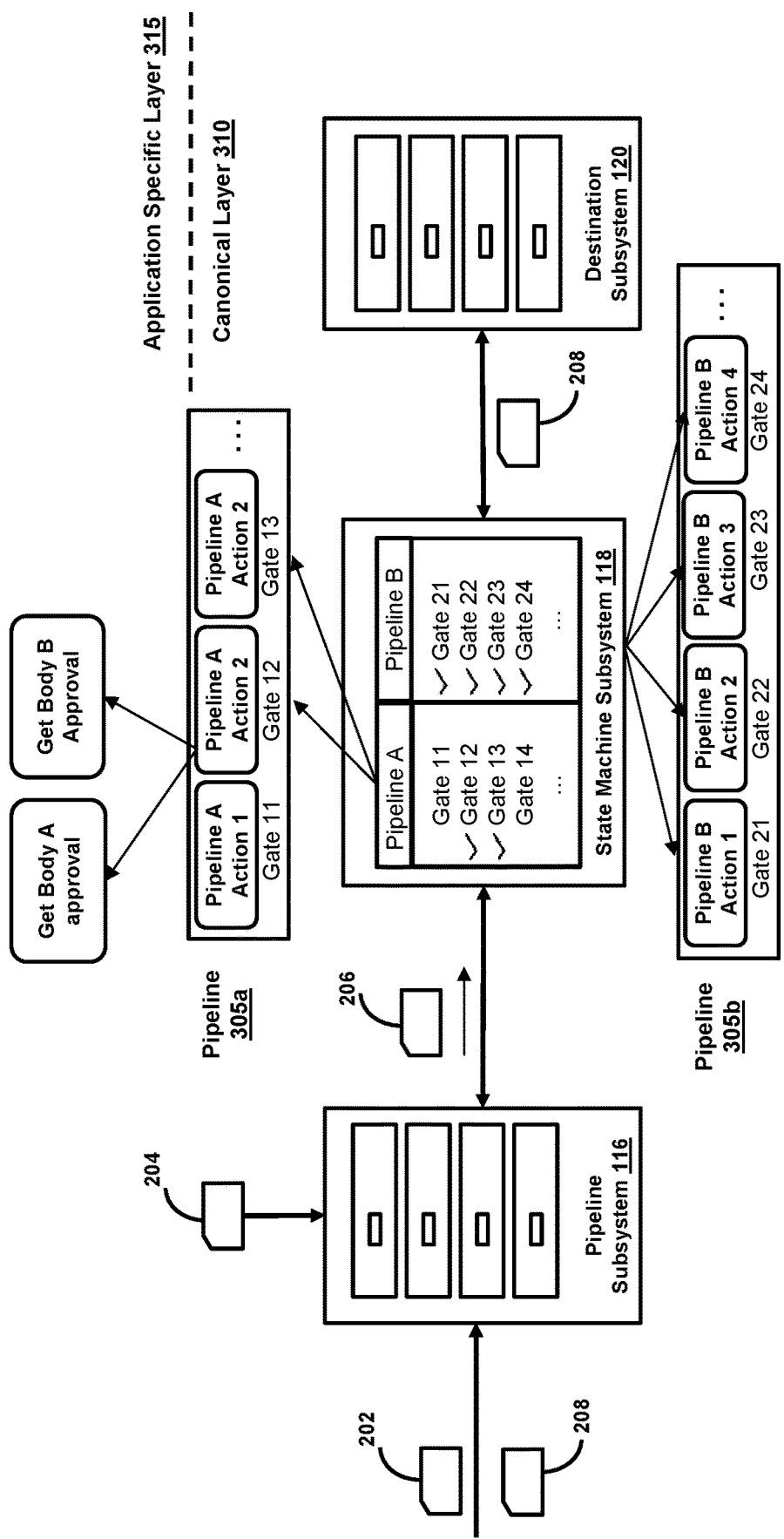
FIG. 3 shows a system for invoking the gates, in accordance with various embodiments.

As an example, FIG. 3 shows a system for invoking the gates, in accordance with various embodiments. After determining the selected set of gates 206, pipeline execution subsystem 116 may provide data regarding the selected set of gates 206 to state machine subsystem 118 and request state machine subsystem 118 to invoke the selected set of gates 206. The state machine subsystem 118 invokes the selected set of gates 206, thereby causing a set of software routines corresponding to the selected set of gates 206 to be executed on one or more portions of the application code. The selected set of gates 206 may represent actions from various sub-pipelines of the software pipeline. For example, the selected set of gates 206 includes two gates "$G_{12}$" and "$G_{13}$" from compliance pipeline 305a and four gates "$G_{21}$"-"$G_{24}$" from software code quality pipeline or Continuous integration/Continuous deployment (CI/CD) pipeline 305b. The two pipelines 305a and 305b may together form software pipeline 305. In some embodiments, the compliance pipeline 305a includes a set of actions for performing compliance actions, such as peer check, risk check, or other actions that may determine compliance (e.g., security compliance, privacy compliance, or other compliance) of the application code. The CI/CD pipeline 305b includes a set of actions for performing software code quality actions on the application code, such as linting, building, testing, deploying, or other actions. In some embodiments, CI refers to the practice of automating application lint, build and testing actions in the software pipeline. After users (e.g., software developers) create or update the application code, they commit their changes to a source control repository (e.g., database 132 or development subsystem 122). This commit may launch an automated lint, build or testing operation that validates the application code whenever changes are checked into the repository. In some embodiments, CD refers to automation of application delivery process by adding a deploy stage or action, which is where application 208 is prepared and released for production (e.g., in destination subsystem 120). The deploy stage may include test and code-release automation that ensures the application code is ready for deployment. As part of this process, the application code may be compiled and delivered to a staging area (e.g., in pipeline execution subsystem 116) in preparation for production.

The state machine subsystem 118 invokes the selected gates "$G_{21}$"-"$G_{24}$" from the CI/CD pipeline 305b causing a set of software routines corresponding to the lint, build, unit test, or deploy to be executed on one or more portions of the application code. Similarly, the state machine subsystem 118 invokes the selected gates "$G_{12}$" and "$G_{13}$" from the compliance pipeline 305a causing a set of software routines corresponding to the risk check execute on one or more portions of the application code. In some embodiments, while the state machine subsystem 118 is configured to invoke a specified gate for performing a specified action, the state machine subsystem 118 is agnostic to application specific actions. For example, state machine subsystem 118 may be configured to invoke gate "$G_{12}$" for performing a risk check process, which may include a generic action such as requesting a specific individual or team in an organization to review the application code 208 for any risks and provide an approval. However, the specific individual or the team to which the request is to be sent may depend on one or more attribute values of the application being progressed and the state machine subsystem 118 may be agnostic to such application specific actions. For example, application specific action may include sending the request to one or more users associated with "Body A," such as a "Model Risk Office," if the process type of the application is "model" or to one or more users associated with "Body B," such as "EUC Risk Office," if the process type of the application is "EUC". In some embodiments, state machine subsystem 118 may be configured to cause the application specific action to be executed by having a two layered approach in compliance pipeline 305a. For example, the first layer may be a canonical layer 310 including generic actions (e.g., which are generic across applications), such as risk check, and the second layer may be an application specific layer 315, which may include actions specific to the application being progressed, such as "Get Approval from Body A," "Get Approval from Body B," or other application specific actions, that are invoked by generic actions in the first layer 310. In some embodiments, configuration file 202 may have attribute values related to the application specific action to be executed. For example, configuration file 202 may have attribute values such as a location, e.g., URL, of the software routine for the application specific action "Get Approval from Body A." The attribute values may also include an email ID of a contact person to which the approval request has to be sent. When the gate "$G_{12}$" for performing the generic action "risk check" is invoked, the state machine subsystem 118 may pass the attribute values of the application specific action, such as the URL of the "Get Approval from Body A" software routine and email ID of the contact person, to the "risk check" gate, which may then invoke the corresponding software routine in the application specific layer 315 based on the received attribute values for performing the application specific action. As an example, the "risk check" gate is provided with an URL of the "Get Approval from Body A" software routine in the application specific layer 315, and/or additional attribute values (e.g., email ID of the contact person to whom the email for approval is to be sent) to be passed to the software routine. Accordingly, the "Get Approval from Body A" software routine is executed with the received attribute values (e.g., which may send an approval request email to the contact person based on the received email ID).

After pipeline execution subsystem 116 determines that all the selected set of gates 206 are invoked and the corresponding software routines have completed executing successfully, application 208 may be deployed to destination subsystem 120 (e.g., production environment). For example, pipeline execution subsystem 116 may send a message to destination subsystem 120 indicating the availability of application 208 for deployment, which may cause destination subsystem 120 to deploy application 208. After application 208 is deployed in destination subsystem 120, application 208 may be available to one or more consumers of application 208.

Subsystems 112-124

In some embodiments, configuration file subsystem 112 facilitates management (e.g., generating or editing) of configuration file 202. As described above, a configuration file includes properties of an application. The properties may be indicated as attributes and attribute values that are descriptive of the application. The attributes or attribute values may be user-defined (e.g., software developer or another user). The configuration file may also include other parameters such as a name of the software routine to be invoked, location (e.g., URL) of the software routine, contact information of one or more users (e.g., email ID), or other parameters. In some embodiments, any application that is to be progressed in the pipeline may have an associated configuration file describing the properties of the application. Different applications may have different attributes or attribute values. The configuration file subsystem 112 may generate a graphical user interface (GUI) for generating configuration file 202. A user (e.g., software developer or other user) may interact with the GUI, using client device 104a, to input data for generating configuration file 202. The configuration file subsystem 112 may generate configuration file 202 in any of various formats that is processible by pipeline execution subsystem 116 or state machine subsystem 118. For example, configuration file 202 may be generated in YAML format.

It should be noted that the list of attributes/attribute values described above are examples, and the attributes/attribute values are not restricted to the above; they may be different for different applications, and may further be user-defined.

The gate mapping file subsystem 114 facilitates management of gate mapping file 204. As described above, a gate is a software component that represents an action to be performed for progressing the application in the pipeline and corresponds to a software routine that performs the action (e.g., a software routine for compiling application code). In some embodiments, invoking a gate causes the corresponding software routine to be executed for performing the action. A gate mapping file includes a number of mappings of gates and attribute values. Each mapping in the gate mapping file indicates a set of gates to be invoked for a set of attribute values.

The gate mapping file subsystem 114 may provide a GUI for managing (e.g., creating or editing a mapping) the gate mapping file 204. A user (e.g., software developer, a compliance team member in an organization, or other user) may interact with the GUI, using client device 104a, to input data for generating the gate mapping file 204. For example, the GUI may provide a list of available attributes, attribute values and gates for generating a mapping. The user may generate a mapping by selecting a set of attributes and attribute values and a set of gates to be invoked from the list. The user may generate multiple such mappings. To edit a mapping, the user may access gate mapping file 204 using the GUI, select a specified mapping and make the necessary changes (e.g., add or remove a gate from the specified mapping, add, change or remove an attribute or attribute value from the specified mapping, or other changes) to the specified mapping and store the revised gate mapping file 204. For example, if a user determines that a new compliance action is to be performed for application 208, the user may update gate mapping file 204 by adding a new gate (e.g., "Gig") that corresponds to the new compliance action to the second mapping. For example, the revised second mapping may be "$A_1V_1, A_2V_2, A_3V_1 \rightarrow G_{12}, G_{13}, G_{21}, G_{22}, G_{23}, G_{24}$, Gig". After the revised gate mapping file is stored (e.g., in database 132), pipeline execution subsystem 116 may process the application code with the revised gate mapping file to execute the new compliance action (e.g., additionally or alternatively to the previously specified actions). The gate mapping file 204 may also be updated to add new mappings or delete existing mappings.

The pipeline execution subsystem 116 facilitates the progression of application 208 in the pipeline. The pipeline execution subsystem 116 includes various software or hardware components for executing various actions on the application code to progress application 208 in the pipeline. In some embodiments, pipeline execution subsystem 116 includes or interacts with a version management system that manages application code. The version management system stores the application code in a repository (e.g., database 132). When users commit the application code in the version management system, execution of the pipeline may be triggered and pipeline execution subsystem 116 may process configuration file 202 and gate mapping file 204 to determine a set of gates to be invoked for progressing application 208. As an example, a first stage of the pipeline may include compiling the application code. As another example, a first stage of the pipeline may be triggered by invoking a web service and providing configuration file 202 to the web service.

In some embodiments, pipeline execution subsystem 116 also includes various software components (e.g., in database 132) and hardware components (e.g., a server, a database, or other hardware components) for setting up a production environment to deploy the application. For example, if the production environment in which application 208 is to be deployed is a cloud platform such as EMR, pipeline execution subsystem 116 may perform the tasks for packaging the application code in a format required by EMR, setting up an EMR cluster, and deploying the application. Similarly, pipeline execution subsystem 116 also includes various software components (e.g., in database 132) and hardware components for setting up a staging environment to deploy the application. In some embodiments, the staging environment is a subset of production environment and includes an environment setup that resembles the production environment as closely as possible and may connect to other production services and data, such as databases. In some embodiments, a staging environment may be used to test all the installation/configuration/migration scripts and procedures before they are applied to a production environment.

The state machine subsystem 118, as described above, facilitates invocation of gates for progressing the application in a pipeline. The state machine subsystem 118 may include various software components or hardware components (e.g., a server, a database, or other hardware components) for invoking selected set of gates 206. In some embodiments, a state machine is a collection of states that may perform actions, determine which states to transition to next, stop an execution with an error, and so on. A complex problem may be broken down into smaller and manageable pieces called states, with each state being delegated a narrowly defined action. Each state may correspond to a gate which, when invoked, causes execution of a corresponding software routine to perform the action. Modeling the gates using state machine subsystem 118 may ensure a self-documenting and compact representation of the software that automatically satisfies non-functional demands like manageability, extensibility, modifiability and determinism. State machines with well-defined states and events may keep in control the growth of conditional logic as well as ad-hoc code branching out in the software, and thereby control the overall cyclomatic complexity. By using state machine subsystem 118 to invoke the gates, the complex coding or conditional logic required to determine which actions are to be performed for which conditions or attribute values of an application may be minimized or eliminated.

Further, state machine subsystem 118 may invoke at least some of the gates asynchronously. When two gates are invoked asynchronously, the corresponding two actions are executed independent of one another instead of sequentially (e.g., one after the other). That is, the software routines corresponding to the two different gates may be executed independent of one other and the execution of one is not dependent on the other. As an example, when a gate corresponding to a human approval action is invoked (which can take a long time to completed), other actions of the pipeline may not have to wait to execute until the corresponding user responds. However, in some embodiments, state machine subsystem 118 may be programmed to execute at least some gates sequentially.

It should be noted that a gate may represent any type of action to be performed on the application code and is not limited to software code quality actions or compliance actions described herein. As an example, software code quality actions may include linting, building, testing, validating, deploying, or other actions on the application code. As another example, compliance actions may include peer check, risk check, or other actions that may determine compliance (e.g., security compliance, privacy compliance, or other compliance) of the application code. In some embodiments, a compliance action may involve obtaining an approval of the application code from one or more users associated with the application code (e.g., a specific individual or a team of individuals in an organization). In some embodiments, a compliance action may invoke systems or services to record information related to the deployment of the application. For example, the compliance action can invoke any RESTful end point that performs any function. In some embodiments, the compliance action may be useful to insert steps that may not be related to application code quality or compliance, but to check the data that application code uses to operate. Such compliance actions may be useful at least for applications of "model" process type to ensure that the input data that will be used is approved data.

The destination subsystem 120 is an environment where application 208 is deployed (e.g., by the pipeline execution subsystem 116). The destination subsystem 120 includes various software components or hardware components (e.g., a server, a database, or other hardware components) to host and execute application 208. As an example, the destination subsystem 120 may be a staging environment (which is described above) where application 208 is deployed and tested prior to deployment in a production environment. As another example, the destination subsystem 120 may be a production environment where application 208 is deployed and made available to consumers of application 208. In some embodiments, destination subsystem 120 where application 208 will be deployed is determined based on the destination attribute in the configuration file. As an example, if the destination attribute has an attribute value "exploratory," application 208 may be deployed in destination subsystem 120 that is a staging environment, whereas application 208 may be deployed in destination subsystem 120 that is a production environment if the destination attribute has an attribute value "production."

In some embodiments, the production environment is also known as live environment, particularly for servers, as it is the environment that consumers of the application directly interact with. The pipeline execution subsystem 116 may deploy new code directly (overwriting old code, so only one copy is present at a time), or make changes to the existing code. In some embodiments, when deploying a new release of application 208 to the production environment, rather than immediately deploying to all instances or consumers, application 208 may be deployed to a single instance or fraction of users first, and then either deployed to all or gradually deployed in phases, in order to find and resolve any last-minute errors (e.g., can be specified using one or more attribute values in configuration file, mappings in gate mapping file, configuring the production environment, or some other technique). An example of the destination subsystem 120 may be a cloud platform such as EMR.

The development subsystem 122 facilitates development of application 208. The development subsystem 122 may include various software components and hardware components (e.g., a server, a database, or other hardware components) for developing application 208. The development subsystem 122 may include software components such as an integrated development environment (IDE), application packages, libraries, compilers, virtual machines, or other software components, to write or generate the application code. The development subsystem 122 may support development of application 208 in one or more programming languages (e.g., Python, Java, C++, or other programming languages). A user (e.g., software developer or other user) may interact with development subsystem 122 using client device 104a.

Example Flowcharts

Figure 4:
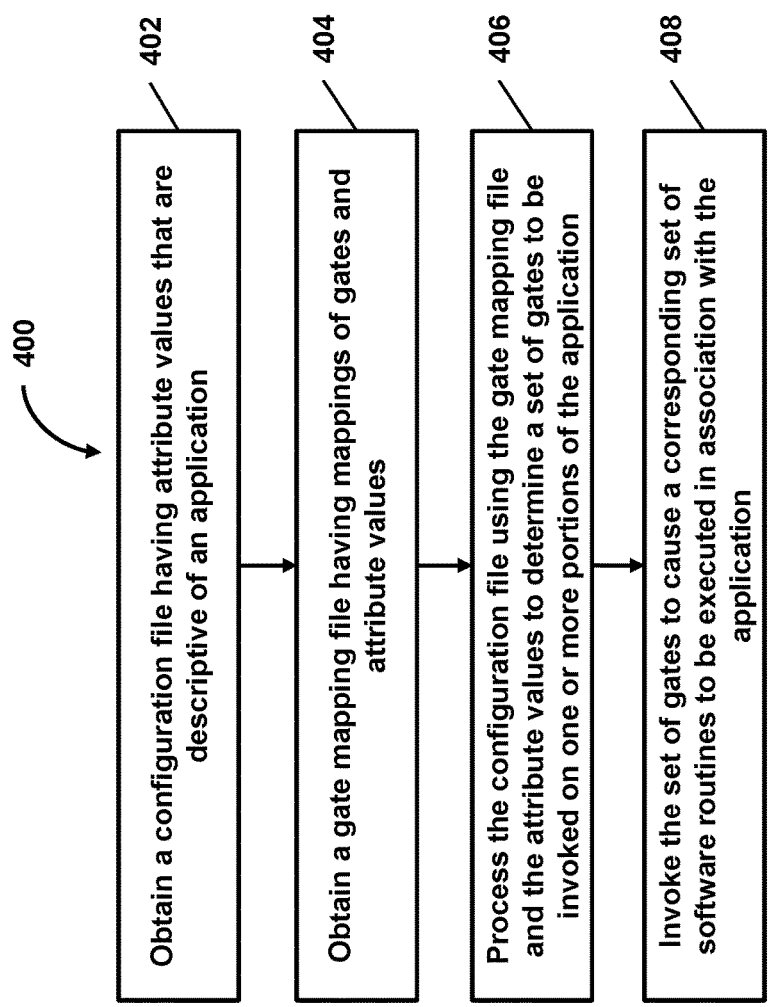
FIG. 4 shows a flowchart of a method for facilitating configuration of a pipeline by the use of gates for progressing an application in a pipeline, in accordance with one or more embodiments.
Figure 5:
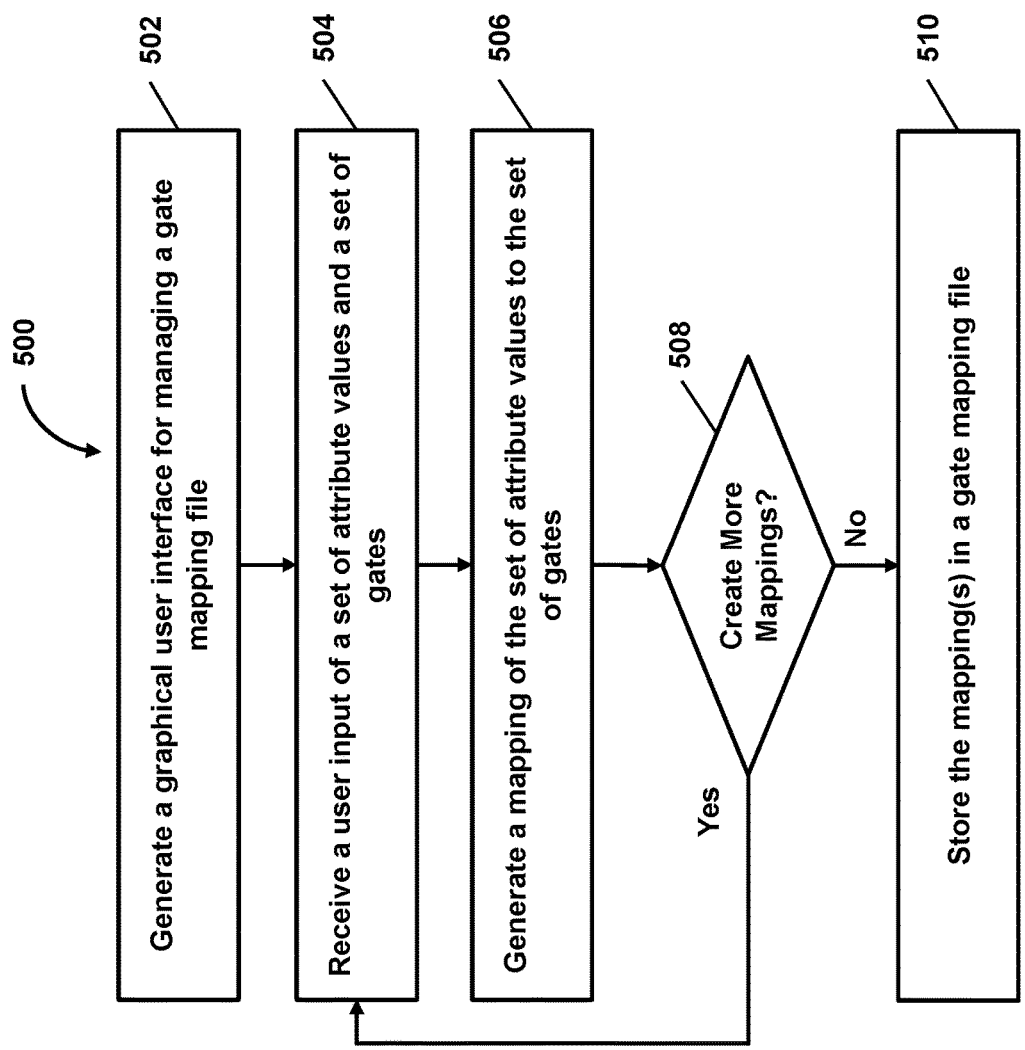
FIG. 5 shows a flowchart of a method 500 for facilitating generation of a gate mapping file, in accordance with one or more embodiments.

FIGS. 4 and 5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for facilitating configuration of a pipeline by the use of gates for progressing an application in a pipeline, in accordance with one or more embodiments. In an operation 402, configuration file 202 associated with application 208 is obtained. The configuration file 202 may include properties of application 208 as attributes and attribute values. As an example, the configuration file may include attributes such as process type ("$A_1$"), destination ("$A_2$"), release type ("$A_3$"), geographical region ("$A_4$") where the application is to be deployed or where the consumers of the application are located, programming language of the application ("$A_5$"), materiality of the application ("$A_6$"), or other attributes. Each of the attributes may have one or more attribute values. For example, the process type attribute ("$A_1$"), which indicates a type of the application to be progressed in the pipeline, may have "model ($V_1$)," "EUC ($V_2$)," "report ($V_3$)," "high-priority data ($V_4$)," or other value as the attribute value, which indicates a type of application 208. The destination attribute ("$A_2$") may have "exploratory ($V_1$)," "production ($V_2$)," or another value as the attribute value, which is indicative of destination subsystem 120 where the application is to be deployed (e.g., a cloud platform such as EMR). The programming language attribute ("$A_5$") may have "python ($V_1$)," "Java ($V_2$)," or another value as the attribute value, which is indicative of a programming language of the application. Operation 402 may be performed by a subsystem that is the same as or similar to configuration file subsystem 112, in accordance with one or more embodiments.

In an operation 404, gate mapping file 204 that includes mappings of gates and attribute values are obtained. As described above, a gate is a software component that is representative of an action and corresponds to one or more software routines for performing that action. For example, a gate "$G_{11}$" (e.g., as illustrated in FIG. 3) may represent a compliance action such as "peer check," and may correspond to a software routine for requesting another user for peer review of the application code and obtaining an approval from the other user. When a gate is invoked, a software routine is executed for performing the corresponding action. Each mapping in gate mapping file 204 indicates a set of gates to be invoked for a set of attribute values. In other words, each mapping indicates a set of actions to be performed for progressing an application having a set of attribute values. As an example, a first mapping in gate mapping file 204 indicates that a first set of gates—"$G_{11}$," "$G_{12}$," "$G_{21}$," "$G_{22}$"—are to be invoked if the attributes "$A_1$," "$A_2$," "$A_3$" have values "$V_1$," "$V_1$," and "$V_2$" (denoted as "$A_1 V_1$," "$A_2 V_1$," "$A_3 V_2$"), respectively. The gate mapping file 204 may include a number of such mappings indicating the gates to be invoked for various combinations of attribute values. Operation 404 may be performed by a subsystem that is the same as or similar to gate mapping file subsystem 114, in accordance with one or more embodiments.

In an operation 406, configuration file 202 and gate mapping file 204 are processed to determine a mapping from gate mapping file 204 that matches the attribute values from the configuration file 202. As an example, it is determined that a second mapping ("$A_1 V_1$," "$A_2 V_2$," "$A_3 V_1$") matches the attribute values from configuration file 202. Accordingly, it is determined that the gates "$G_{12}$," "$G_{13}$," "$G_{21}$," "$G_{22}$," "$G_{23}$," and "$G_{24}$" in the second mapping (selected set of gates 206) are to be invoked for progressing application 208. Operation 406 may be performed by a system that is the same as or similar to pipeline execution subsystem 116, in accordance with one or more embodiments.

In an operation 408, the selected set of gates 206 are invoked to cause a set of software routines corresponding to the selected set of gates 206 execute on one or more portions of the application code. After it is determined that all the selected set of gates 206 are invoked and the corresponding software routines have completed executing successfully, application 208 may be deployed to destination subsystem 120 (e.g., production environment). Operation 408 may be performed by a system that is the same as or similar to state machine subsystem 118, in accordance with one or more embodiments.

FIG. 5 shows a flowchart of a method 500 for facilitating generation of gate mapping file 204, in accordance with one or more embodiments.

In an operation 502, a GUI is generated for facilitating management of gate mapping file 204. For example, the GUI may be generated on the client device 104a.

In an operation 504, user input of a set of attribute values and a set of gates is received in the GUI. As an example, the user may input a set of attribute values ("$A_1 V_1$," "$A_2 V_2$," "$A_3 V_1$") and a set of gates "$G_{12}$," "$G_{13}$," "$G_{21}$," "$G_{22}$," "$G_{23}$," and "$G_{24}$." The GUI may be configured to receive user input in various ways. For example, the GUI may provide a list of available attributes and attribute values from which the user may select. Similarly, the GUI may provide a list of available gates from which the user may select.

In an operation 506, a mapping of the set of attribute values and the set of gates is generated. In some embodiments, the mapping is generated and temporarily stored in a memory of gate mapping file subsystem In an operation 508, a determination is made whether additional mappings are to be generated. For example, the GUI may display a prompt asking the user if additional mappings are to be created. If a determination is made that no additional mappings are to be created, the mapping created in operation 506 is stored in gate mapping file 204 (operation 510). If a gate mapping file is already existing (e.g., in database 132), the mapping is added to the existing gate mapping file or else a new gate mapping file is generated.

In the operation 508, if a determination is made that additional mappings are to be created, then the method proceeds to operation 504 to create additional mappings.

Gate mapping file 204 may be generated in a format that is suitable for processing by system 100. For example, gate mapping file 204 may be of a text file format or other format. For example, the mapping may be generated with IDs of attributes, attribute values and gates, such as "$A_1V_1$, $A_2V_2$, $A_3V_1 \rightarrow G_{12}$, $G_{13}$, $G_{21}$, $G_{22}$, $G_{23}$, $G_{24}$". In another example, the mapping may be generated with actual attribute values and action names "model+production+major+UK+python-→riskcheck+lint+build+test+deploy," which indicates that the actions "risk check," "lint," "build," "test," and "deploy" are to be performed if the application has attribute values "model," "production," "major," "UK," and "python."

Operations 502-510 may be performed by a subsystem that is the same as or similar to gate mapping file subsystem 114, in accordance with one or more embodiments.

In some embodiments, the various computers and subsystems illustrated in FIG. 1 may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of computer system 102 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some, or all of the functionality attributed herein to one of subsystems 112-122.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: obtaining a configuration file having a set of attribute values that is descriptive of an application; obtaining a software component mapping file having a plurality of mappings of a plurality of software components and a plurality of attribute values, wherein each mapping indicates a specified set of software components to be invoked for a specified set of attribute values, wherein the plurality of software components corresponds to software routines for processing software code of a specific application; processing the configuration file using the software component mapping file to determine a set of software components from the plurality of software components to be invoked based on the set of attribute values; and causing the set of software components to be invoked for execution of a set of software routines corresponding to the set of software components.

2. The method of embodiment 1, wherein determining the set of software components includes determining a mapping from the mappings having attribute values that match the set of attribute values; and determining software components from the determined mapping as the set of software components to be invoked.

3. The method of embodiments 1-2, wherein causing the set of software components to be invoked for execution of the set of software routines includes executing the set of software routines to facilitate deployment of the application in a production environment.

4. The method of any of embodiments 1-3, wherein executing the set of software routines includes determining the production environment based on a destination attribute value in the configuration file.

5. The method of any of embodiments 1-2, wherein causing the set of software components to be invoked for execution of the set of software routines includes executing the set of software routines to facilitate deployment of the application in a staging environment.

6. The method of any of embodiments 1-2, wherein causing the set of software components to be invoked for execution of the set of software routines includes executing the set of software routines to perform a software code quality action of application code.

7. The method of any of embodiments 1-6, wherein the set of software routines includes software routines for one or more of linting the software code, building the software code, testing the software code, deploying the software code to a test environment, or deploying the software code to a production environment.

8. The method of embodiments 1-2, wherein causing the set of software components to be invoked for execution of the set of software routines includes executing the set of software routines to perform a compliance action of application code.

9. The method of any of embodiments 1-8, wherein executing the set of software routines includes: determining successful execution of the set of software routines, and sending a message to a production environment in response to the successful execution of the set of software routines to cause the production environment to deploy the application.

10. The method of any of embodiments 1-9 further comprising: generating the configuration file in a format processible by a state machine subsystem that is configured to invoke the set of software components.

11. The method of any of embodiments 1-10, wherein causing the set of software components to be invoked for execution of the set of software routines includes: providing an attribute value of the set of attribute values to a software component of the set of software components, and executing a software routine corresponding to the software component based on the provided attribute value.

12. The method of any of embodiments 1-11, wherein the provided attribute value includes a uniform resource locator of the software routine to be executed.

13. The method of embodiment 1 further comprising: obtaining information regarding a new software routine to be executed based on at least one of the attribute values; modifying the software component mapping file to add a mapping of a new software component to the new software routine; and storing the modified software component mapping file in the storage system.

14. The method of embodiment 12, wherein causing the set of software components to be invoked further includes: causing the new software component to be invoked in addition to the set of software components.

15. The method of any of embodiments 1-14, wherein causing the set of software components to be invoked for execution of the set of software routines includes: executing at least some software routines from the set of software routines asynchronously.

16. The method of any of embodiments 1-14, wherein causing the set of software components to be invoked for execution of the set of software routines includes: executing at least some software routines from the set of software routines sequentially.

17. The method of embodiment 1, wherein the attribute values include values for two or more of a process type, deployment destination, an operational mode, programming language of the software code, or execution-dependent attributes of the application.

18. A tangible, non-transitory, machine-readable medium storing instructions that, when executed by a data processing apparatus, cause the data processing apparatus to perform operations comprising those of any of embodiments 1-17.

19. A system comprising: one or more processors; and memory storing instructions that, when executed by the processors, cause the processors to effectuate operations comprising those of any of embodiments 1-17.

What is claimed is:

1. A system for executing gates of a pipeline for deploying an application, the system comprising:
a computer system including one or more processors programmed with computer program instructions that, when executed, cause operations comprising:
obtaining, from a storage system, a compliance configuration file associated with an application, the compliance configuration file comprising (i) a programming language in which the application is written, (ii) a geographic region related to the application, and (iii) other attribute values descriptive of the application;
obtaining, from the storage system, a compliance gate mapping file comprising mappings of gates to respective attribute values, the gates comprising source code processing gates for processing specific software source code of a specific application, the mappings comprising (i) a first mapping indicating a first gate to be invoked for a first attribute value set having a first programming language, (ii) a second mapping indicating a second gate to be invoked for a second attribute value set having a second programming language, (ii) a third mapping indicating a third gate to be invoked for a third attribute value set having a first geographic region, and (iv) a fourth mapping indicating a fourth gate to be invoked for a fourth attribute value set having a second geographic region;
processing, via a state machine subsystem, the configuration file using (i) the compliance gate mapping file and (ii) the programming language, geographic region, and other attribute values for the application to determine a set of gates to be invoked on one or more portions of the application; and
executing, via the state machine subsystem, a software routine set corresponding to the set of gates, wherein executing the software routine set comprises:
(i) in response to the programming language in the compliance configuration file being the first programming language and the geographic region in the compliance configuration file being the first geographic region, executing software routines corresponding to the first and third gates indicated in the gate mapping file to process source code of the application; and
(ii) in response to the programming language in the compliance configuration file being the second programming language and the geographic region in the compliance configuration file being the second geographic region, executing software routines corresponding to the second and fourth gates indicated in the gate mapping file to process source code of the application.

2. The system of claim 1, wherein the geographic region related to the application comprises a target consumer geographic region in which intended consumers of the application are located, and
wherein executing the software routine set corresponding to the set of gates comprises:
(i) in response to the target consumer geographic region being the first geographic region, executing software routines corresponding to the third gate indicated in the gate mapping file; and
(ii) in response to the target consumer geographic region being the second geographic region, executing software routines corresponding to the fourth gate indicated in the gate mapping file.

3. The system of claim 1, wherein the compliance configuration file associated with an application indicates a machine learning model type of the application, and
wherein executing the software routine set corresponding to the set of gates comprises:
(i) in response to the machine learning model type being a first machine learning model, executing software routines corresponding to a fifth gate on a first sample input dataset corresponding to the first machine learning model; and
(ii) in response to the machine learning model type being a second machine learning model, executing software routines corresponding to a sixth gate on a second sample input dataset corresponding to the second machine learning model.

4. A method implemented by one or more processors executing computer program instructions that, when executed, perform the method, the method comprising:

obtaining a configuration file associated with an application, the configuration file comprising a set of attribute values indicating (i) a programming language in which the application is written and (ii) a geographic region related to the application;
obtaining a software component mapping file comprising mappings of software component sets to respective attribute values, the mappings comprising (i) a first mapping indicating a first software component set to be invoked for a first attribute value set having a first programming language, (ii) a second mapping indicating a second software component set to be invoked for a second attribute value set having a second programming language, (ii) a third mapping indicating a third software component set to be invoked for a third attribute value set having a first geographic region, and (iv) a fourth mapping indicating a fourth software component set to be invoked for a fourth attribute value set having a second geographic region;
processing the configuration file using (i) the software component mapping file and (ii) the set of attribute values of the application to determine a software component set to be invoked on one or more portions of the application; and
causing the software component set to be invoked such that: (i) in response to the programming language being the first programming language and the geographic region being the first geographic region, software routines corresponding to the first and third software component sets are executed to process source code of the application; and (i) in response to the programming language being the second programming language and the geographic region being the second geographic region, software routines corresponding to the second and fourth software component sets are executed to process source code of the application.

5. The method of claim 4, wherein causing the software component set to be invoked comprises executing a software routine set corresponding to the software component set to facilitate deployment of the application in a production environment.

6. The method of claim 5, wherein executing the software routine set comprises:
determining the production environment based on a destination attribute value in the configuration file.

7. The method of claim 5, wherein executing the software routine set comprises:
determining successful execution of the software routine set, and
sending a message to the production environment in response to the successful execution of the software routine set to cause the production environment to deploy the application.

8. The method of claim 4, wherein the geographic region related to the application comprises a target consumer geographic region in which intended consumers of the application are located, and
wherein causing the software component set to be invoked comprises causing the software component set to be invoked such that (i) in response to the target consumer geographic region being the first geographic region, software routines corresponding to the third software component are executed; and (ii) in response to the target consumer geographic region being the second geographic region, software routines corresponding to the fourth software component set are executed.

9. The method of claim 4, wherein obtaining the configuration file includes generating the configuration file in a format processable by a state machine subsystem that is configured to invoke the software component set.

10. The method of claim 4, wherein causing the software component set to be invoked comprises:
providing an attribute value of the set of attribute values to a software component of the software component set, the attribute value comprising a uniform resource locator of a software routine corresponding to the software component to be executed; and
executing the software routine corresponding to the software component based on the provided attribute value.

11. The method of claim 4, further comprising:
obtaining information regarding a new software routine to be executed based on at least one attribute of the set of attribute values;
modifying the software component mapping file to add a mapping of a new software component to the new software routine; and
storing the modified software component mapping file.

12. The method of claim 11, wherein causing the software component set to be invoked comprises:
causing the new software component to be invoked in addition to the software component set.

13. The method of claim 4, wherein causing the software component set to be invoked comprises:
executing at least some software routines from the software routine set asynchronously.

14. The method of claim 4, wherein causing the software component set to be invoked comprises:
executing at least some software routines from the software routine set sequentially.

15. The method of claim 4, wherein the configuration file comprises the set of attribute values in human-readable data-serialization language.

16. A non-transitory computer-readable medium storing instructions that, when executed by one or more processors, cause operations comprising:
obtaining a configuration file associated with an application, the configuration file comprising a set of attribute values indicating (i) a programming language in which the application is written and (ii) a geographic region related to the application;
obtaining a software component mapping file comprising mappings of software component sets to respective attribute values, the mappings comprising (i) a first mapping indicating a first software component set to be invoked for a first attribute value set having a first programming language, (ii) a second mapping indicating a second software component set to be invoked for a second attribute value set having a second programming language, (ii) a third mapping indicating a third software component set to be invoked for a third attribute value set having a first geographic region, and (iv) a fourth mapping indicating a fourth software component set to be invoked for a fourth attribute value set having a second geographic region;
processing the configuration file using (i) the software component mapping file and (ii) the set of attribute values of the application to determine a software component set to be invoked on one or more portions of the application; and
invoking the software component set such that: (i) in response to the programming language being the first programming language and the geographic region being the first geographic region, software routines corresponding to the first and third software component sets are executed to process source code of the application; and (i) in response to the programming language being the second programming language and the geographic region being the second geographic region, software routines corresponding to the second and fourth software component sets are executed to process source code of the application.

17. The non-transitory computer-readable medium of claim 16, wherein invoking the software component set comprises executing a software routine set corresponding to the software component set to facilitate deployment of the application in a production environment.

18. The non-transitory computer-readable medium of claim 16, wherein the operations further comprise:
    obtaining information regarding a new software routine to be executed based on at least one attribute of the set of attribute values; and
    modifying the software component mapping file to add a mapping of a new software component to the new software routine; and storing the modified software component mapping file.

19. The non-transitory computer-readable medium of claim 16, wherein invoking the software component set comprises:
    determining successful execution of a software routine set corresponding to the software component set, and
    sending a message to a production environment in response to the successful execution of the software routine set to cause the production environment to deploy the application.

20. The non-transitory computer-readable medium of claim 16, wherein the geographic region related to the application comprises a target consumer geographic region in which intended consumers of the application are located, and
    wherein causing the software component set to be invoked comprises causing the software component set to be invoked such that (i) in response to the target consumer geographic region being the first geographic region, software routines corresponding to the third software component are executed; and (ii) in response to the target consumer geographic region being the second geographic region, software routines corresponding to the fourth software component set are executed.

* * * * *